US006711564B2

(12) United States Patent
Crucs

(10) Patent No.: US 6,711,564 B2
(45) Date of Patent: Mar. 23, 2004

(54) SYSTEM AND METHOD FOR OPENING AND ACTIVATING APPLICATIONS, WINDOWS OR DATA SETS BASED ON SEARCH CRITERIA

(75) Inventor: Kevin M. Crucs, Copley, OH (US)

(73) Assignee: Apteryx, Inc., Akron, OH (US)

( * ) Notice: Subject to any disclaimer, the term of this patent is extended or adjusted under 35 U.S.C. 154(b) by 291 days.

(21) Appl. No.: 09/783,582

(22) Filed: Feb. 15, 2001

(65) Prior Publication Data

US 2002/0111962 A1 Aug. 15, 2002

(51) Int. Cl.$^7$ .............................................. G06F 17/30
(52) U.S. Cl. ............................ 707/3; 707/5; 707/704.1
(58) Field of Search .............................. 707/1, 5, 3, 10, 707/200, 104.1; 709/217–8, 221, 226; 345/783, 788, 792; 705/3, 2

(56) References Cited

U.S. PATENT DOCUMENTS

| | | | | |
|---|---|---|---|---|
| 5,859,978 A | * | 1/1999 | Sonderegger et al. | 707/10 |
| 5,956,030 A | * | 9/1999 | Conrad et al. | 345/769 |
| 5,964,700 A | * | 10/1999 | Tallman et al. | 705/2 |
| 6,317,719 B1 | | 11/2001 | Schrier et al. | 705/2 |
| 2002/0022973 A1 | | 2/2002 | Sun et al. | 705/3 |
| 2002/0023067 A1 | * | 2/2002 | Garland et al. | 707/1 |
| 2002/0095416 A1 | * | 7/2002 | Schwols | 707/10 |

* cited by examiner

Primary Examiner—Diane D. Mizrahi
(74) Attorney, Agent, or Firm—Kilpatrick Stockton LLP

(57) ABSTRACT

A method and system for locating data in another application, window or data set. The particular data form (application, window or data set) is located using search criteria derived from a first active data form (application, window or data set). If the particular data form is located in an unloaded (not running) application, window or data set the requisite data form (e.g., application, window or data set) is launched and made active. The necessary data is provided to the application, window or data set to retrieve the particular window or data set of the data form. If the particular data form is located in a loaded application, window or data set, the necessary data from the first data form is bridged into the loaded application, window or data set.

18 Claims, 4 Drawing Sheets

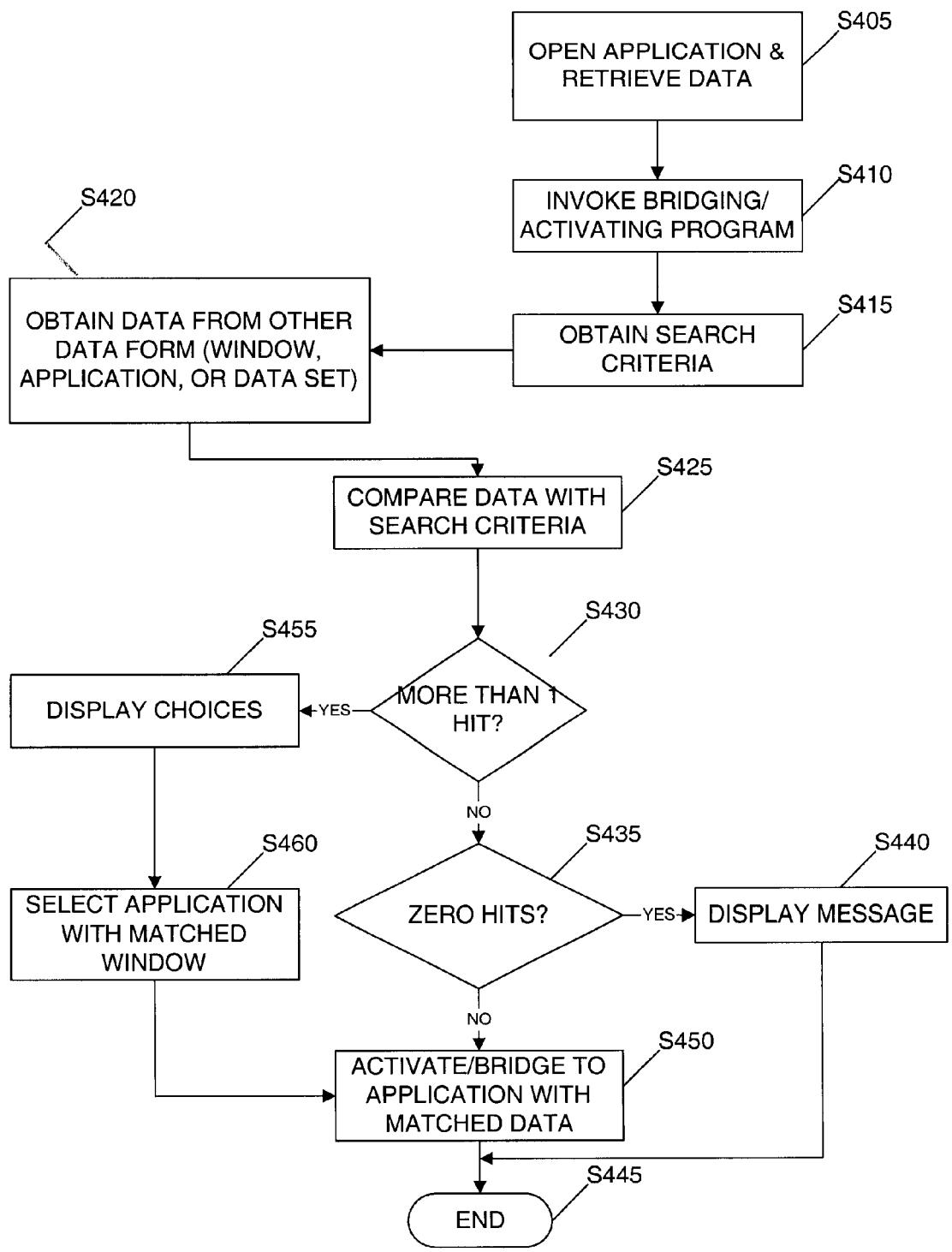

SYSTEM AND METHOD FOR OPENING AND ACTIVATING APPLICATIONS, WINDOWS OR DATA SETS BASED ON SEARCH CRITERIA

BACKGROUND OF THE INVENTION

1. Field of the Invention

The present invention relates to a system and method for searching for data in a plurality of applications, windows or data sets and using that data to bridge to, activate or open another application, window or data set.

2. Description of the Related Art

Each year there is an increase in the amount of computer automation for the home and office. Typically, these increases occur in discrete software applications that are specific to a desired goal or objective. For example, there are individual applications for billing, payroll, word processing, time keeping, inventory tracking and personal organization. Each of these applications can be implemented and distributed by a different vendor and loaded onto a single computer.

User applications typically share compatibility and operability with an operating system that controls the computer. Typical examples of operating systems are Windows 95™, Windows 98™, Windows 2000™ and Windows NT™ available from Microsoft Corp., Linux™ available from Red Hat, OS/2 available from IBM Corp. and the Apple Macintosh Operating System available from Apple Computer, Inc. Thus, each application installed onto the computer must be able to run on the operating platform supporting the computer.

Operating Systems available today allow a user to have more than one (1) application running (loaded or open) simultaneously. This is also called multi-processing. Before opening (or launching) and application it is in an "unloaded" state, stored in permanent or long term storage/memory. When an application is "launched" it becomes the "active" application. If another application is launched, a loaded and active application remains loaded, but becomes "inactive". Thus, multiple applications may be loaded and "running" at any one time. However, unless the computer has multiple processors (CPUs), only one application is actually "active" at a time.

One problem many users face when using a plurality of applications, windows or data sets is switching between the various applications, windows or data sets running simultaneously. For example, suppose a user is obtaining data about a patient from a practice management application in a doctor's office and wants to look at that patient's digitally stored x-ray images. The user must open or re-activate the x-ray image application, window or data set; enter some search term that designates that patient; and wait for the application, window or data set to return with that patient's x-ray images in the appropriate window. Thus, even though the user has the patient's identifying data in the practice management application he/she is viewing, the user must open or activate the x-ray imaging application, and must then enter a query to locate and obtain the window containing the desired data. These additional unnecessary operations can be time-consuming if the employee is processing multiple patients per day.

The burden of having to manually enter data when the required data is available to the user in another window, application or data set is compounded when certain applications, windows or data sets require multiple pieces of data. For example, some applications, windows or data sets require both a name and a social security number in order to distinguish between patients who have the same name. In this example, the different social security numbers distinguish between the files of these two patients and their respective related information. Thus, even if a user is viewing a particular patient's profile in a patient management application and has the patient's social security number on screen, the user will still be required to type in the social security number, in addition to the patient's name, in the other desired application like an x-ray imaging application. Some Windows™ programs allow a user to "cut-and-paste" information from one window to another. However, this method is time consuming when several fields of data need to be re-entered.

There is also a need to open a plurality of files across a plurality of applications, windows or data sets in a network environment. In such a network environment, a first user could open one window in one application where that one window contains data useful to a plurality of other users in the network. The other users could access that data from the one window in the one application and use it to open other windows in other applications via a single click of a mouse button, instead of being forced to click on a plurality of boxes and/or type in the needed key data to open a file.

In addition, in either a single PC operation or a network operation, there is a need for a user to integrate a new application, window or data set with existing applications, windows or data sets. In this manner, a user may purchase a new application and use the present invention to integrate the data residing in files in an existing application, window or data set to create new files in the new application, window or data set.

BRIEF SUMMARY OF THE INVENTION

The present invention is designed to overcome the problems relating to searching for and inputting data in a plurality of applications, windows or data sets by providing a method that bridges between two or more applications, windows or data sets. The present invention accomplishes this bridging by searching for specific data amongst a plurality of applications, windows and data sets, and uses that data to activate one or more target applications, windows or data sets with that data. These objectives, among others, are achieved by means of a computer-implemented method for bridging applications, windows or data sets comprising obtaining search criteria, obtaining data associated with a data set, comparing the data with the search criteria, extracting additional data from the data set if a match is determined, and passing the additional data to an application.

BRIEF DESCRIPTION OF THE DRAWINGS

The accompanying drawings, which are incorporated in and form part of the specification, illustrate preferred embodiments of the present invention and, together with the description, disclose the principles of the invention. In the drawings:

FIG. 4 is a flowchart of a process in accordance with a preferred embodiment of the present invention.

DETAILED DESCRIPTION OF THE INVENTION

For purposes of describing the present invention, the following definitions are to be used, and, if necessary, supercede any commonly understood definition of the term.
Data Form A data form is any collection of data or information. Included within a data form are computer programs or applications that are organized forms of data that control a computer to perform certain tasks and functions.
Window A window is a graphic feature that allows a user to view information and provide information to a computer/application. A window may be a part of many applications.

Figure 1:
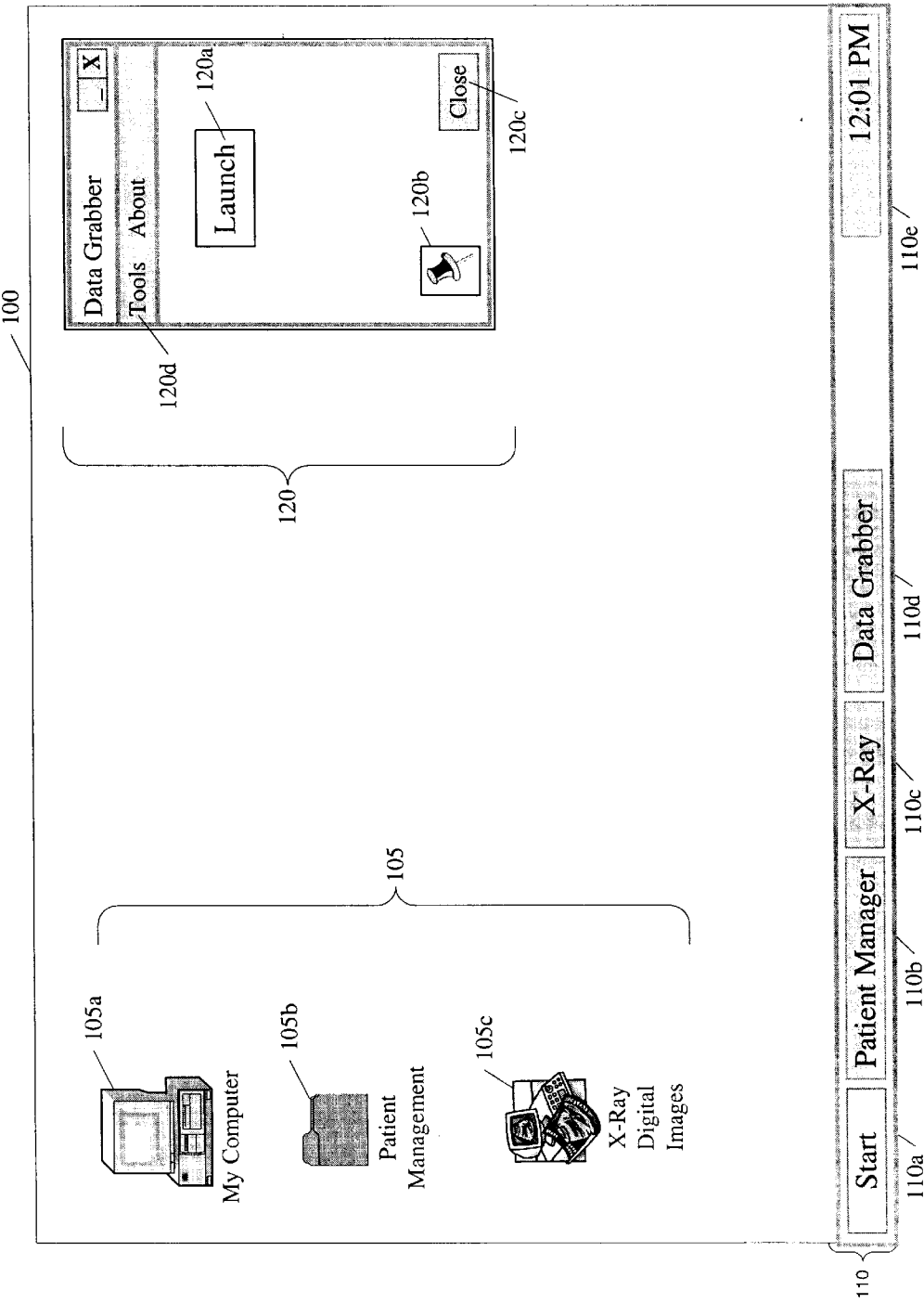
FIG. 1 is a screen shot of a preferred embodiment of the present invention.

FIG. 1 is a sample screen from a computer using the Windows NT™ operating system in accordance with an embodiment of the present invention. The entire screen is designated by the reference number 100. Within screen 100 are shortcuts to specific applications 105. In this exemplary screen 100, there are three individual shortcuts 105 to three different applications. In this context, a shortcut is a link represented by a stylized icon that appears on the desktop of the operating system that allows the user to launch an application by double-clicking on that shortcut. The first shortcut 105a is a standard shortcut with the Windows NT™ operating system called "My Computer" that allows a user to view data in the various media drives associated with the computer. Shortcut 105b is a shortcut to an application for entering, editing, viewing and maintaining patient files. Shortcut 105c is a shortcut to an application for creating and managing patient x-rays.

The task bar (including Start Menu and System tray) 110 is part of the operating system. Depending on the operating system version, the task bar comprises a plurality of buttons and/or icons representing both executing (loaded) and non-executing (unloaded) applications available to the user. Some buttons expand to menus, for instance the Start Menu, when one clicks on them. Start button 110a is a standard feature of the Windows NT™ operating system. Button 110b relates to the patient management application described above in conjunction with shortcut 105b. Button 110c relates to the x-ray imaging application described above in conjunction with shortcut 105c. Button 110d relates to the invention described herein. Area 110e is part of the System Tray (Systray) and comprises shortcut icons for a plurality of common system tools and applications, such as printer status when printing a document, and a clock. It should be noted that in other embodiments of the present invention, the present invention can be launched from an icon located in area 110e.

Buttons 110b–110d allow the user to switch between the described applications, windows or data sets, e.g., changing the active/inactive status of an application that is running (loaded) by clicking on the associated button. In the present invention, active means that the application, window or data set has been downloaded from permanent or long term storage, like a hard drive, or swap file, into the computer's RAM and is ready for use by the user. When the user clicks on a particular button, the current active application, window or data set remains loaded into memory, but is sent to the background (made inactive). This means that the application, window or data set remains in the computer's RAM, but the user is unable to interact with it until the application, window or data set is reactivated. In some cases, the application will be swapped to temporary space on the hard drive (swap space) rather than remain in RAM, if RAM is limited. By clicking on these buttons, the user may toggle between various applications, windows or data sets, making one active and causing the others to be deactivated. This makes it easier for the user to switch between the various applications, windows or data sets. It should be noted that the present invention is limited neither to the types of applications, windows or data sets, nor to the number of applications, windows or data sets shown in FIG. 1.

FIG. 1 also demonstrates yet another implementation in which a user may launch the present invention. Window 120 is a "sliding window" that can be used to execute the present invention. To bring this window into view, the user slides the cursor, using a mouse or a touchscreen, over to the top-right side of window 100. Note that the activating location "top-right" is not fixed, and it would be apparent top one skilled in the art how to modify the activating location on the screen to another area of the display. When the cursor "exits" the viewing area to the top-right, window 120 slides into view. If the user moves the cursor back into the viewing area of window 100 but outside of window 120, the window 120 slides back out of view. When slid into view, the user may then launch the present invention by clicking on the "Launch" button 120a.

If the user wishes to tack the sliding window 120 into a fixed location on the screen, he/she may do so by clicking on button 120b (stylized as a push-pin). Button 120b operates so as to tack window 120 into position regardless of the mouse location. If the user does not wish to execute the program which implements the present invention, he/she may click on the "Close" button 120c. The "Tools" executable menu 120d allows the user to modify and customize the application and window descriptions, as will be described in more detail later.

Figure 2:
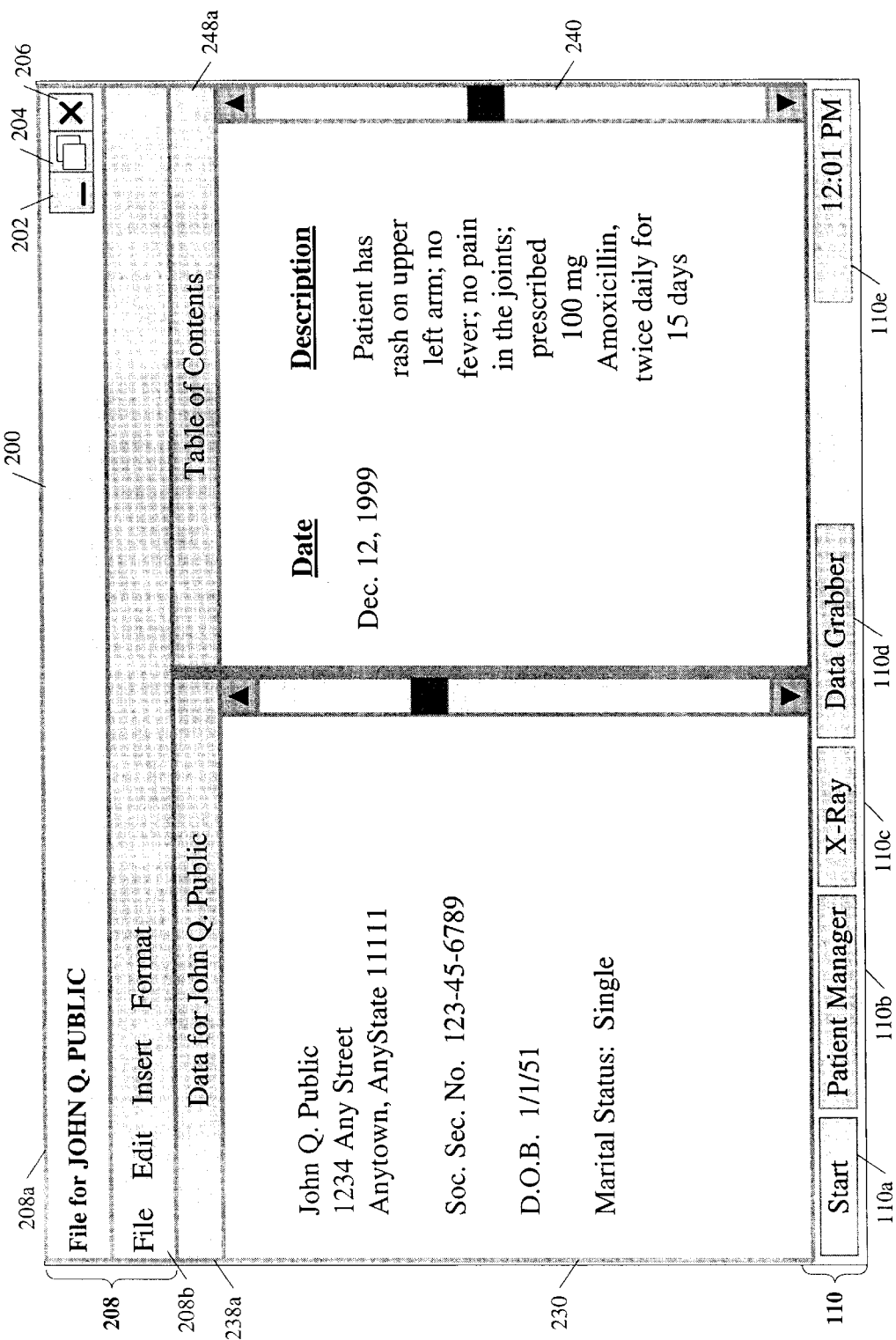
FIG. 2 is a screen shot of an application that implements an embodiment of the present invention.

FIG. 2 is an exemplary screen shot of the windows used in an exemplary patient management application. The screen shot includes parent window 200 and child windows 230 and 240. From one perspective, parent window 200 encompasses child windows 230 and 240. Within parent window 200 there are standard window function buttons, 202 for minimizing, 204 for displaying multiple files in a cascade fashion and 206 for closing. Parent window 200 also includes menu bar 208. Menu bar 208 has two components. Title bar 208a displays the name of the particular data set being operated upon by the application. In the example shown in FIG. 2, the particular data set relates to John Q. Public and is being operated upon by the "Patient Manager" application. Underneath title bar 208a is a menu bar 208b which allows the user to invoke various functions and operations within the application presently running.

Child window 230 is an exemplary window for displaying a patient's personal data such as name, address, date of birth, social security number, insurance information, etc. Within child window 230 is title bar 238a, which is similar to title bar 208a.

Child window 240 is an exemplary window for displaying the patient's medical history. The medical history is a list of dates a doctor saw this particular patient and a brief description of the doctor's diagnosis and prescribed treatment. Also within child window 240 is title bar 248a.

Figure 3:
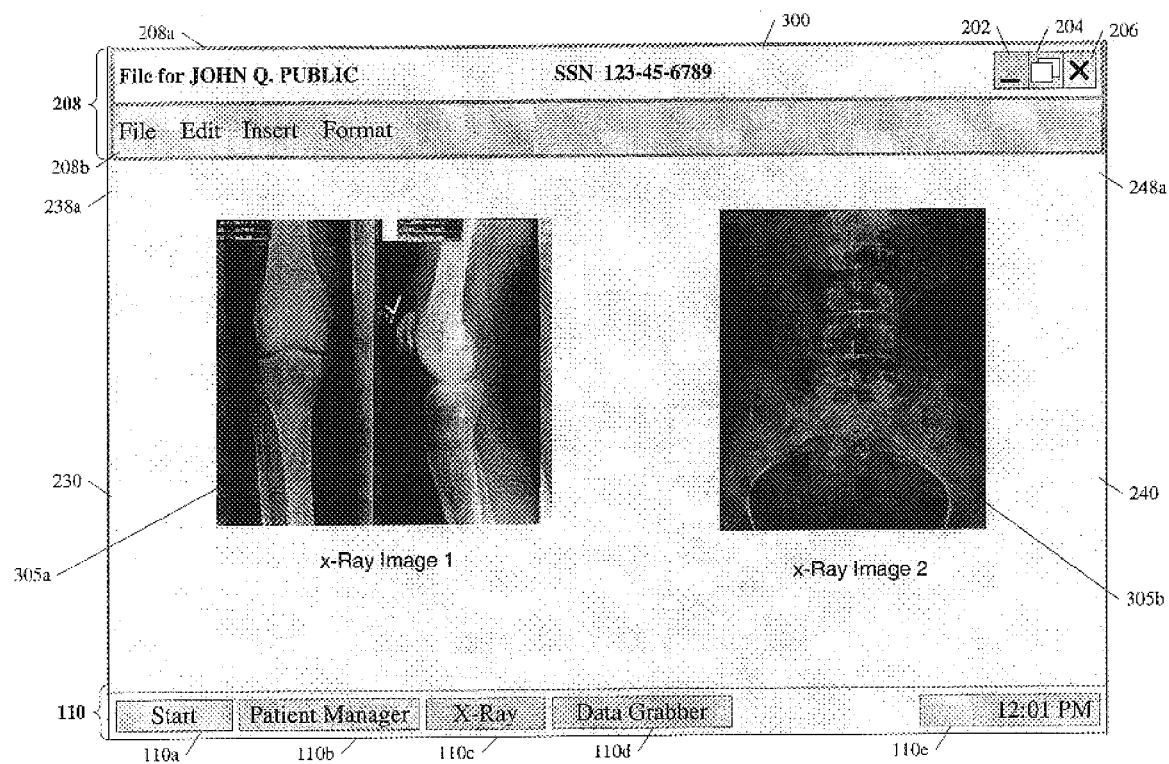
FIG. 3 is a screen shot of another application that implements an embodiment of the present invention.

FIG. 3 is an exemplary screen shot of the windows used in an exemplary digital x-ray image application. Window 300 contains the same features as window 200, such as title bar 208 and task bar with system tray 110. In addition, window 300 also contains windows 305a and 305b for displaying x-ray images. It should be noted that window 300 is merely exemplary and other configurations of windows in a digital x-ray imaging application are possible.

FIG. 4 is a flowchart of a process in accordance with a preferred embodiment of the present invention. The process begins at block S405 where a user opens a "data form", e.g., an application, window or data set, and retrieves particular data (i.e., patient information) within the data form. As an example, the user is a receptionist who retrieves patient John Q. Public's information into the patient management application. Once the application is opened, the receptionist is able to enter, delete or otherwise interact with John Q. Public's data in the windows of that application. At block S410, the user invokes the present invention. This can be accomplished by using the sliding window 120, or an icon (not shown) in system tray 110e as shown in FIG. 1, or by other standard methods compatible with the specific operating system.

Once invoked, data from the currently active window, or data form, is entered at block S415. In a preferred embodiment, this data can be any one or more of the following categories of data. The first category of data is text data. Referring to FIG. 2, one example of such text data is "JOHN Q. PUBLIC" in title bar 208a. This data is usually automatically generated by the application. For example, when John Q. Public first became a patient with the office that uses the exemplary patient management application, the receptionist (i.e., user) typed his name into the application and thereby into this particular window. It should be noted that other data, such as the phrase "File for" is also text data that is automatically generated by the application and placed into the window. It should also be noted that other patient-associated data, such as the patient's demographic data, address, phone number, social security number, date of birth, gender, etc., are also input by the user into the application.

The second category of data is window class data. This data is the name of the class of the window where the class itself contains features and attributes of that particular window. This data is created by the writers and programmers of the application. Again, in the exemplary patient management application, the programmers may have titled a class "XYZ" where windows of class "XYZ" have similar features (i.e., ability to support graphics).

The third category of data is a control identifier (ID). This data is also provided by the writers and programmers of the application, and is used by the operating system to provide functionality. Like the class definition above, the programmers of a particular application assign a control ID to a window for which they build a class. The data is extracted in block S415 based upon a description of the application that is currently active. More specifically, in the patient management application exemplary screen shown in FIG. 2, the description of the window shown includes a patient. In other words, window 200 in patient management application contains patient-specific information (i.e., John Q. Public). Thus, the present invention extracts patient information based upon the description of the patient management application that is saved in a library. It should be noted that this exemplary patient data is a subset of the category of text data described above. It should also be noted that these application and window descriptions can be modified via the "Tools" menu 120d shown in FIG. 1.

For instance, the relationships among search criteria and applications or data forms may be defined in advance and entered using the "Tools" menu 120d functionality. If a particular data form is to be activated or launched in response to search criteria which is a member of a specific category of defined data forms, then this relationship may be entered and saved in advance, rather than at the time of each query. An example would be that the x-ray imaging application is to be used when a search is performed when the practice management application is active, for certain windows in that application. This relationship is defined and entered into the present invention with other relationships. Then, if the user performs actions requiring the x-ray imaging application, as defined by the pre-defined relationships, the x-ray imaging application is launched if it was previously unloaded. Alternatively, the user could be given the option to enter a program to launch each time a search is performed.

The piece or pieces of data read from the categories listed above from the currently active data form (window or data set) make up the search criteria. This search criteria is compared to other similar category data in other windows at block S425. The windows, or data forms to be used for comparison would be defined as described above. Further, the extraction formats for various data required to be extracted from the data forms for comparison is defined in advance, using the Tools menu 120d, as shown in FIG. 1. It would be apparent to one skilled in the art how to customize the present invention for various applications based on the inherent relationships of the data in the related data forms.

At block S420, data is obtained from other windows, applications or data sets (data forms). Data is obtained from both active and loaded/inactive (i.e., those windows either in the background, minimized or not displayed) applications, windows or data sets (i.e., those windows currently being used by the user. One should note that if a data form is defined as related to the search criteria or active data form, it would be launched and become loaded (but typically inactive) prior to the extraction of data for comparison.

At block S425, comparisons are made between the search criteria developed in block S415 and data extracted from the data forms (windows or data sets) in block S420.

At block S430, the present invention determines if the search returned more than one hit. If not, the process continues at block S435 where it is determined if the search returned no hits. If the answer is "Yes," then a display informing the user that no other data form having that data exist on this computer is provided at block S440 and the process then ends at block S445.

If, at block S435, it is determined that there are not zero hits, the process continues at block S450, where the operating system uses the search criteria to invoke a command to activate the appropriate data form, which, in turn, makes visible the window or data set associated with the matched data for display and interaction with the user. The process then ends at block S445. If the target data form, or application, is already loaded but is currently minimized, or inactive, the present invention bridges to the target data form, restores it in the foreground display, and passes the necessary data to the target data form so that the appropriate window or data set is made visible and populated with the appropriate data.

If, at block S430, it is determined that more than one window or data set is found matching the search criteria, a display is provided at block S455, showing the user the text names of the matching windows or data sets. At block S460, the user selects which of the plurality of applications, windows or data sets he/she desires to use. At block S450, that application, window or data set is then provided to the user as described above and the process ends at block S445.

While the present invention has been described above using the example of a doctor's office, it can be readily appreciated that other environments and applications can be bridged by the present invention. One such environment is in a warehouse and fulfillment business.

This business has two different applications that can be synchronized using the present invention. One application is an inventory application and the other is a billing/invoice application. As customers order items (i.e., books, automobile parts, etc.) from the company, the warehouse must package those purchased items for shipment to the respective customers. The inventory application must be updated as items are removed or added from/to the warehouse. Thus, a warehouse employee would open a window for an item, say a particular novel, in order to decrease the number of that item therein by one. Such an exemplary window would include the title of the book, author and a tracking number such as an ISBN. This data is text data in an application, window or data set as described above.

If, at the same time the employee generates an invoice to be inserted into the packaging, he might desire to open a new invoicing window and insert the part number, title or author name to complete the invoice. With the present invention, instead of requiring the employee to enter this data again, he/she would invoke the present invention, extract the relevant text data from the inventory application, window or data set and use it to open a corresponding invoice application for this product.

As an example, alternative embodiments of the present invention may use only one type of data (i.e., text data like a patient's name) to search for other applications, windows or data sets, while, in other embodiments, two or more types of data (i.e., text data like a patient's name and integer data like a social security number) are used to search for other applications, windows or data sets.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A computer-implemented method for searching and inputting data between one or more dataforms, the method comprising the steps of:

obtaining search criteria from an active first data form;

obtaining first data from one or more data forms;

comparing the search criteria with the first data;

determining if a match occurs between the search criteria and first data; and extracting second data from the one or more data forms and inputting the second data into the first data form when a match occurs.

2. The computer-implemented method of claim 1 wherein the search criteria is a string of characters.

3. The computer-implemented method of claim 1 wherein the search criteria is selected from the group consisting of text data, window class data and control identifier data.

4. The computer-implemented method of claim 1 wherein the first data form is a window.

5. The computer-implemented method of claim 1 wherein at least one of the one or more data forms is a window.

6. The computer-implemented method of claim 1 further comprising the step of activating the second data form.

7. The computer-implemented method of claim 1 further comprising the step of launching and activating the second data form.

8. The computer-implemented method of claim 1 further comprising the step of displaying text names of each data form having a match between the search criteria and first data when there is a match between the search criteria and the first data from two or more data forms.

9. The computer-implemented method of claim 1 further comprising the step of displaying a message when there is no match between the search criteria and first data.

10. A system for searching and inputting data between one or more dataforms, the system comprising a computer configured for:

obtaining search criteria from an active first data form;

obtaining first data from one or more data forms;

comparing the search criteria with the first data;

determining if a match occurs between the search criteria and first data; and extracting second data from the one or more data forms and inputting the second data into the first data form when a match occurs.

11. The system of claim 10 wherein the search criteria comprises a string of characters.

12. The system of claim 10 wherein the search criteria is selected from the group consisting of text data, window class data and control identifier data.

13. The system of claim 10 wherein the first data form is a window.

14. The system of claim 10 wherein at least one of the one or more data forms is a window.

15. The system of claim 10 wherein the computer is further configured for activating the second data form.

16. The system of claim 10 wherein the computer is further configured for launching and activating the second data form.

17. The system of claim 10 wherein the computer is further configured for displaying text names of each data form having a match between the search criteria and first data when there is a match between the search criteria and the first data from two or more data forms.

18. The system of claim 10 wherein the computer is further configured for displaying a message when there is no match between the search criteria and first data.

* * * * *